United States Patent [19]

Murakami et al.

[11] Patent Number: 4,793,860
[45] Date of Patent: Dec. 27, 1988

[54] AQUEOUS INK COMPOSITION

[75] Inventors: Kakuji Murakami; Masaru Shimada, both of Shizuoka; Tamotsu Aruga, Numazu; Hiroyuki Uemura, Numazu; Kiyofumi Nagai, Numazu, all of Japan

[73] Assignee: Ricoh Company, Ltd., Tokyo, Japan

[21] Appl. No.: 33,350

[22] Filed: Apr. 2, 1987

[30] Foreign Application Priority Data

Apr. 2, 1986 [JP] Japan .................. 61-074284

[51] Int. Cl.$^4$ ...................... C09D 11/02; C09D 11/16
[52] U.S. Cl. ........................................ 106/22; 106/20; 534/809
[58] Field of Search .................... 106/22, 20; 534/809, 534/810, 811

[56] References Cited

U.S. PATENT DOCUMENTS 3,846,141 11/1974 Ostergren et al. ..................... 106/22
4,421,559 12/1983 Owatari ................................ 106/20

FOREIGN PATENT DOCUMENTS 2255652 11/1972 Fed. Rep. of Germany ...... 534/811
47769 4/1985 Japan .................................... 106/22

OTHER PUBLICATIONS

Solomons, T. W. Graham, *Organic Chemistry*, 2nd Edition, John Wiley & Sons, New York, 1980, p. 835.

Primary Examiner—Paul Lieberman
Assistant Examiner—Christine A. Skane
Attorney, Agent, or Firm—Oblon, Fisher, Spivak, McClelland & Maier

[57] ABSTRACT

An aqueous ink composition comprises (a) a dye having formula (I) in an amount of 0.5 to 6.0 wt. %, in which 20% or more of the total of the cations of $-SO_3X$ and $-OX$ groups directly connected to the aromatic rings thereof is replaced by $Li^+$ ion or a quaternary ammonium ion,

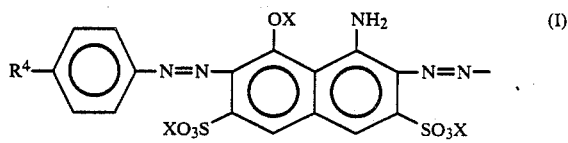

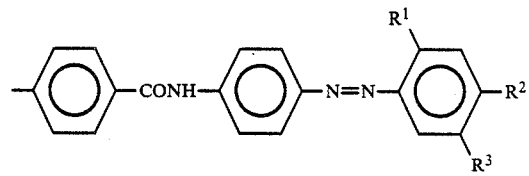

(I)

wherein X represents a cation; $R^1$ represents hydrogen, a hydroxyl group, an alkyl group having 1 to 4 carbon atoms, or an amino group; $R^2$ represents

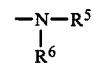

(in which $R^5$ and $R^6$ each represent hydrogen, an alkyl group having 1 to 4 carbon atoms, a hydroxyethyl group, or a cyanoethyl group); $R^3$ represents hydrogen, $-SO_3X$; $R^4$ represents hydrogen, or a $-C_2H_4OX$, (b) a polyhydric alcohol in an amount of at least 10 wt. %; and (c) water.

5 Claims, No Drawings

AQUEOUS INK COMPOSITION

BACKGROUND OF THE INVENTION

The present invention relates to an aqueous ink composition suitable for use as ink for writing instruments in general use, such as ball point pen, marker, fountain pen, for recording apparatus including a pen plotter, and for ink-jet printer.

Generally, in order to perform satisfactory writing and recording by using an ink in the above-mentioned fields, it is required that, for example, the content of a dye in the ink, the density of images printed by the ink, the water resistance and light resistance of the printed images all be high, the physical characteristics of the ink composition such as viscosity and surface tension be in predetermined appropriate ranges, no precipitates be formed in the ink during the storage thereof for an extended period of time, and the pen point of writing instruments and the nozzle of ink-jet printer not be clogged with the ink when used after an extended non-use period.

However, some of the above requirements are incompatible with other requirements. For example, when the content of a dye in the ink is increased in order to increase the obtained image density, the clogging of the pen point or the nozzle is apt to occur and precipitates are easily formed during the storage of the ink.

In order to solve these problems, dyes and organic solvents which are mutually highly soluble, and additives such as surfactant have been searched. As a result, practically usable ink compositions have been developed. However, the image density obtained by such conventional ink compositions is not yet sufficiently high and the problem of the clogging of the pen point and nozzle has not yet been completely solved. Therefore it is desired to solve the clogging problem and to attain high image density at the same time.

In Japanese Laid-Open patent application No. 55-78076, for example, C.I. Direct Black 17, C.I. Direct Black 38, C.I. Direct Black 94, C.I. 27070, C.I. Direct Black 22, C.I. Direct Black 51, C.I. 15711, and C.I. Direct Black 19 are proposed as such dyes. However, their water resistance or solublity in solvents is so poor that they cannot be used satifactorily in practice even if they are used in the form of lithium salt.

Further, in Japanese Laid-Open patent application 57-202358, it is proposed that only lithium sulfonate dyes be employed, and the solvent be water and glycols. However, specific examples of such dyes given in this reference are C.I. Direct Black 19 and C.I. Direct Black 38 and their solubilities are not sufficient for use in practice.

SUMMARY OF THE INVENTION

It is therefore an object of the present invention to provide an aqueous ink composition which is capable of forming water and light resistant images having high density, from which no precipitates separate even if it is allowed to stand for a long period of time, and which does not clog the pen point of writing instruments and the nozzle of ink-jet printer even when it is used again after an extended non-use period.

In order to achieve the above object of the present invention, the aqueous ink composition of the present invention comprises (i) a dye having the following formula (I) in an amount of 0.5 to 6.0 wt.%, in which 20% or more of the total of the cations of —$SO_3X$ and —OX groups directly connected to the aromatic rings is replace by $Li^+$ ion or a quaternary ammonium ion, (ii) a polyhydric alcohol in an amount of at least 10 wt.% and (iii) water:

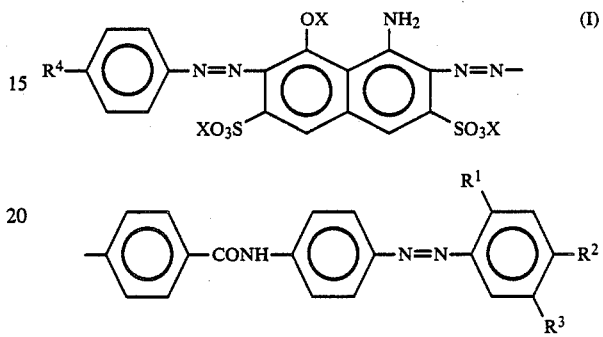

wherein X represents a cation, such as $H^+$, $N^+$, $Li^+$ and a quaternary ammonium cation, $R^1$ represents hydrogen, a hydroxyl group, an alkyl group having 1 to 4 carbon atoms, preferably a methyl group, or an amino group; $R^2$ represents

(in which $R^5$ and $R^6$ each represent hydrogen, an alkyl group having 1 to 4 carbon atoms, preferably a methyl group and an ethyl group, a hydroxyethyl group, or a cyanoethyl group); $R^3$ represents hydrogen, —$SO_3X$; $R^4$ represents hydrogen or —$C_2H_4OX$.

DETAILED DESCRIPTION OF THE PREFERRED EMBODIMENTS

As mentioned above, the aqueous ink composition according to the present invention comprises (i) the above-mentioned dye in an amount of 0.5 to 6.0 wt.%, in which 20% or more of the total of the cations of —$SO_3X$ and —OX groups directly connected to the aromatic rings is replaced by $Li^+$ ion or a quaternary ammonium ion, (ii) a polyhydric alcohol in an amount of 10 wt.% or more, and (iii) water.

In the present invention, when 20% or more of the total of the cations of —$SO_3X$ and —OX groups directly connected to the aromatic rings of the dye is replaced by $Li^+$ ion or a quaternary ammonium ion, the clogging problem can be effectively avoided.

Specific examples of a dye of the previously mentioned general formula (I) for use in the present invention are as follows, which are shown in the form of free acid.

Dye No. 1

-continued
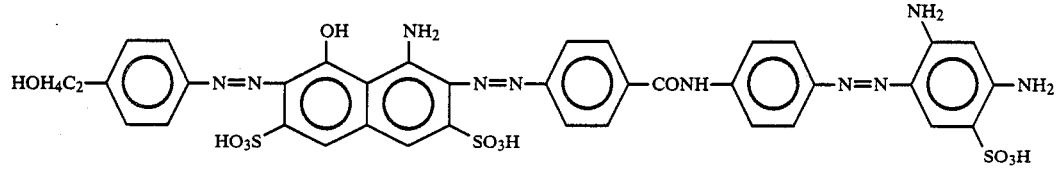
Dye No. 2
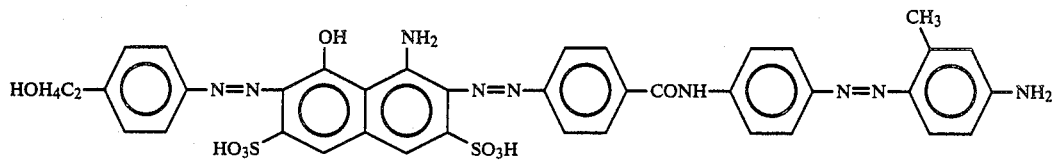
Dye No. 3
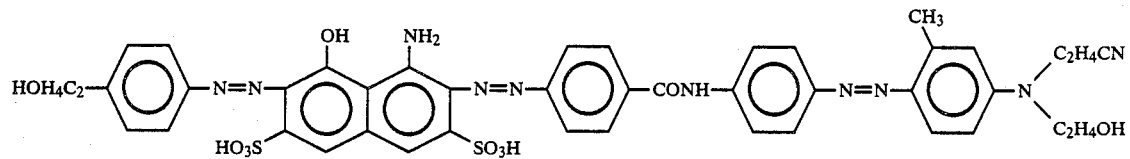
Dye No. 4
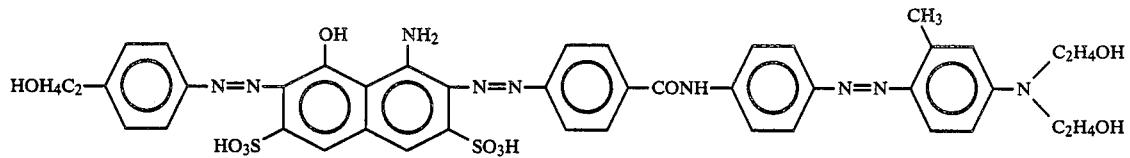
Dye No. 5
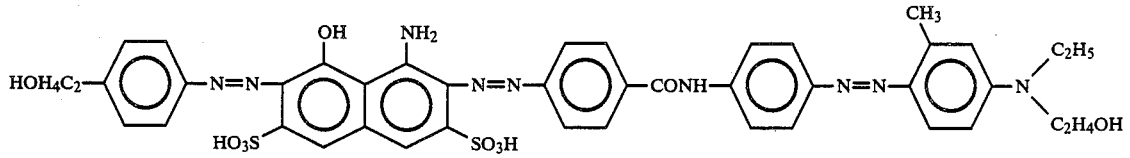
Dye No. 6
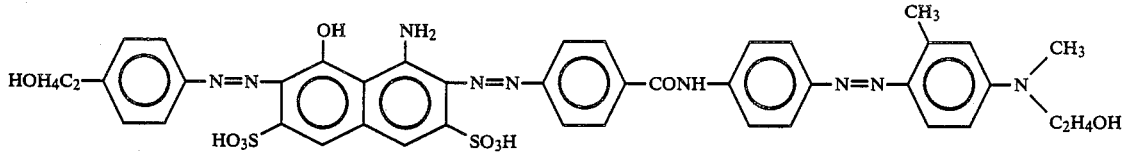
Dye No. 7
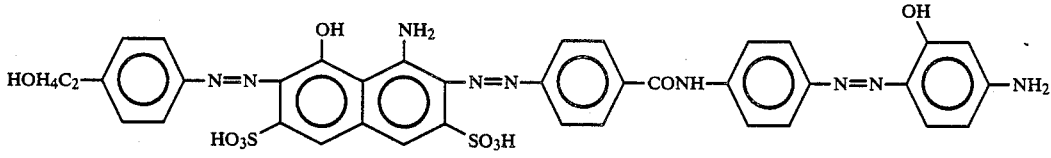
Dye No. 8
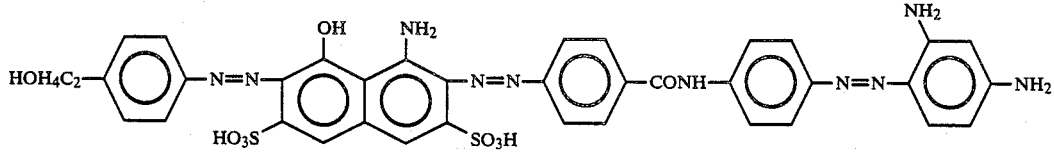
Dye No. 9

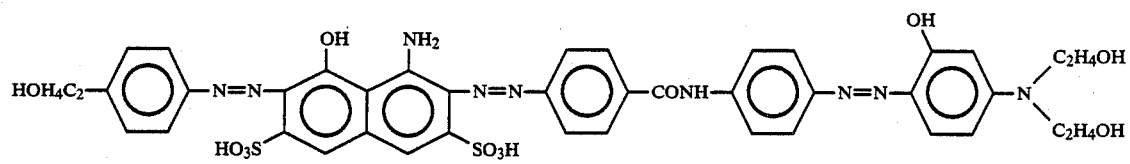
Dye No. 10
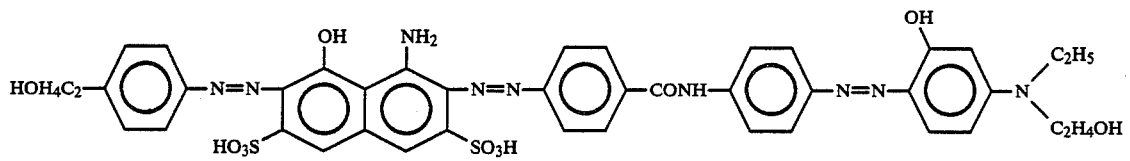
Dye No. 11
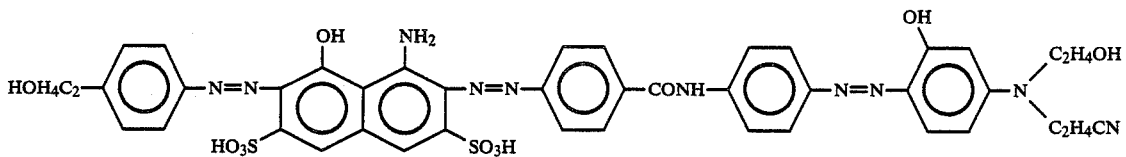
Dye No. 12
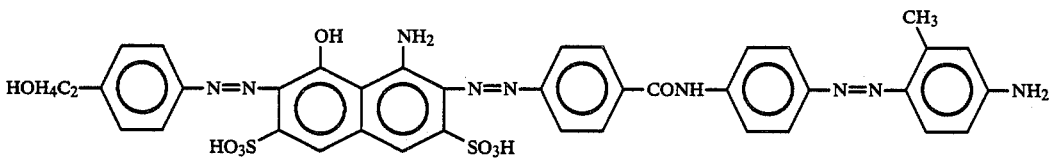
Dye No. 13
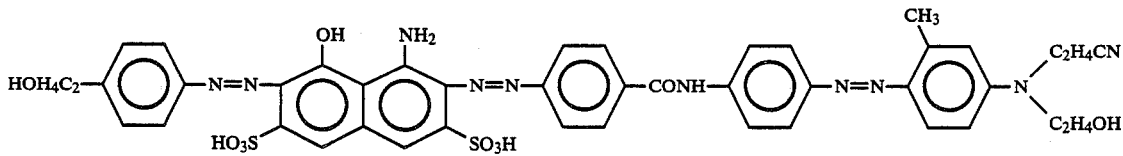
Dye No. 14
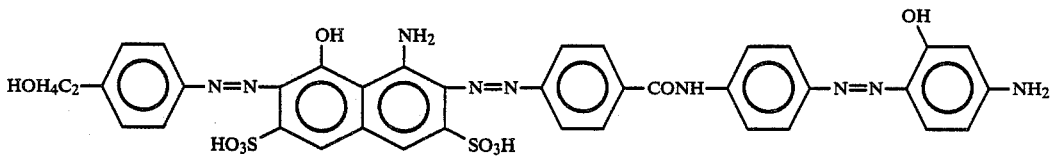
Dye No. 15
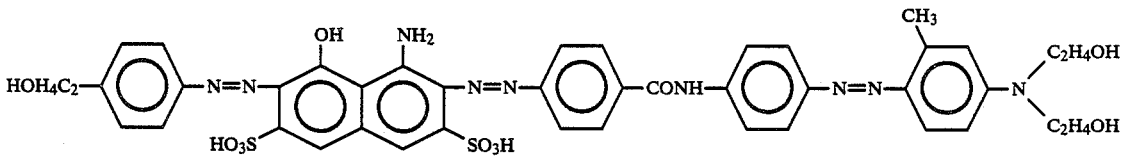
Dye No. 16
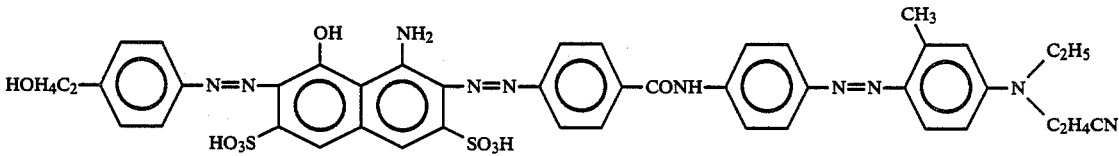
Dye No. 17

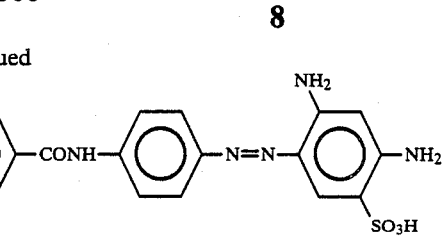

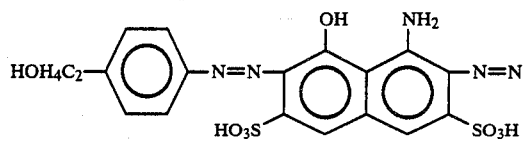

Lithium salts and quaternary ammonium salts of these dyes can be obtained by using lithium hydroxide, lithium carbonate, quaternary ammonium hydroxide or quaternary ammonium carbonate instead of sodium hydroxide and sodium carbonate which are used as alkali components in the course of the synthesis of these dyes. Alternatively, sodium salts of these dyes can be converted to lithium salts or quaternary ammonium salts by (1) adding an acid such as hydrochloric acid and acetic acid to an aqueous solution of a sodium salt of the dye to obtain a free dye, (2) filtering off the free dye, and purifying the dye, for example, by washing it with water to remove the remaining sodium component therefrom, and (3) adding lithium hydroxide or a quaternary ammonium hydroxide to a solution of the free dye.

A quaternary ammonium ion for use in the present invention has the following general formula:

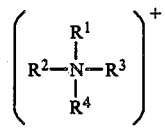

wherein $R^1$, $R^2$, $R^3$ and $R^4$ each represent an alkyl group which may have a substituent, for example, halogen, a hydroxyl group, and —OCH$_2$CH$_2$OH.

In view of the fact that the surface tension and electric conductivity of the ink composition decreases as the number of carbon atoms in the alkyl group of the quaternary ammonium ion is increased, it is preferable that the number of carbon atoms in the alkyl group be in the range of 1 to 4.

Specific examples of a quaternary ammonium ion for use in the present invention are as follows:

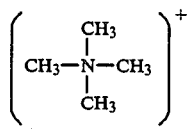 (1)

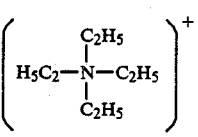 (2)

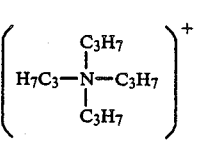 (3)

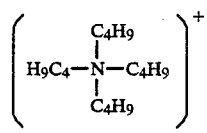 (4)

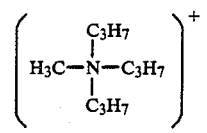 (5)

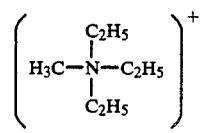 (6)

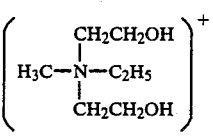 (7)

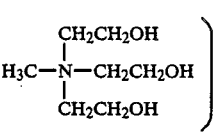 (8)

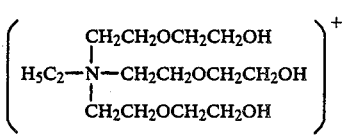 (9)

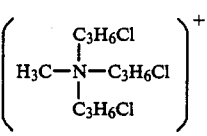 (10)

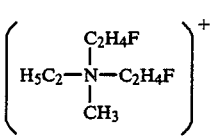 (11)

In the case of an aqueous ink composition for use in an ink-jet recording method in which electric charge is applied to each ink droplet, it is necessary that the electric conductivity of the ink composition be high to a certain extent. For this purpose, it is preferable to use quaternary ammonium hydroxide and lithium hydroxide in combination to prepare the salts of the dyes.

The dyes for use in the present invention are black, reddish black, greenish black and bluish black in color. These dyes can be individually used. For the purpose of obtaining a modified color or pure black, they can be combined appropriately.

When necessary, the following commercially available dyes can be used in combination with the dye for use in the present invention:

Blue dyes: C.I. Direct Blue-1, -8, -71, -76, -86, -108, -200,

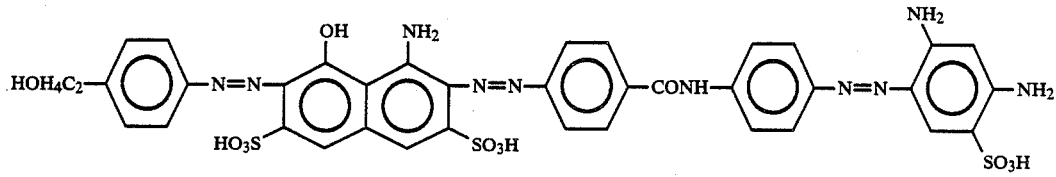

-201, -202, -236; and C.I. Acid Blue-1, -7, -9, -15, -175, -249.

Red dyes: C.I. Direct Red-1, -9, -15, -17, -28, -37, -62, -75, -81, -83, -89, -99, -220, -225, -227; C.I. Acid Red-35, -44, -52, -82, -92, -94, -115, -131, -134, -154, -186, -249, -254, -289.

Yellow Dyes: C.I. Direct Yellow-12, -27, -28, -33, -39, -44, -50, -58, -85, -86, -87, -88, -100, -110, -142, -144; Acid Yellow-7, -17, -23, -42, -44, -79, -99, -142.

Other Dyes: C.I. Direct Orange 26, and C.I. Reactive Blue-2.

In the present invention, it is preferable that the amount of the dye of the previously described general formula (I) be in the range of 0.5 to 6 wt.%, more preferably in the range of 1.5 to 6. wt.%, in order to obtain a sufficiently high image density and to prevent the clogging of the pen point of writing instruments and the nozzle of ink-jet printer with the ink.

As a ployhydric alcohol for use in the present invention, ethylene glycol, diethylene glycol, triethylene glycol, tetraethylene grlycol, polyethylene glycol (M.W. 200~800), glycerin, diethanolamine, triethanolamine, and propylene glycol can be employed.

The above polyhydric alcohols can be used alone or in combination. In order to prevent the clogging problem most effectively, it is preferable that the amount of the polyhydric alcohol contained in the aqueous ink composition be at least 10 wt.%.

When necessary, a water soluble organic solvent can be contained in the aqueous ink composition. Examples of such water soluble organic solvent are ethers of polyhydric alcohols, such as ethylene glycol monoethyl ether, diethylene glycol monomethyl ether, diethylene glycol monoethyl ether, diethylene glycol monobutyl ether, diethylene glycol monophenyl ether, triethylene glycol monomethyl ether, and triethylene glycol monoethyl ether; and other compounds such as N-methyl-2-pyrrolidone, 2-pyrrolidone, and 1,3-dimethyl imidazolidinone.

In addition to the above component, a water-soluble preservative and anti-mold agent, a surfactant, and a pH adjusting agent can be added to the aqueous ink composition. When these additives contain a large quantity of cations, it is preferable that these cations be lithium ion or a quaternary ammonium ion.

It is preferable to employ as pH adjusting agent, for example, lithium hydroxide, lithium carbonate, a quaternary ammonium hydroxide and a quaternary ammonium carbonate.

When it is difficult to obtain preservative and anti-mold agents and other agents in the form of lithium salt or quaternary ammonium salt, sodium salts are more preferably than potassium salts and ammonium salts. However, when these agents are employed, it is preferable that cations other than lithium ion and quaternary ammonium ion not exceed 80% of the entire cations contained in the aqueous ink composition.

Synthesis of Dye No. 1

The previously mentioned Dye No. 1 having the following formula was synthesized as follows:

2.3 g of 4,4'-diaminobenzanilide was dissolved, with stirring, in 100 ml of a 3% aqueous solution of hydrochloric acid at temperatures below 5° C. To this solution, an aqueous solution consisting of 20 ml of water and 1.5 g of sodium nitrite was gradually added with stirring, so that 4,4'-diamino-benzanilide was diazotized. After the stirring was continued for 1 hour, the remaining sodium nitrite was decomposed by adding sulfamic acid thereto, whereby a diazo liquid was obtained.

To this diazo liquid, an aqueous solution consisting of 3.6 g of 8-amino-1-naphthol-3,6-di-sodium sulfonate and 250 ml of water was gradually added with stirring at 5° C., so that the diazo coupling reaction was performed, which was continued for 15 hours, whereby a monoazo liquid was obtained.

10 g of sodium acetate was added to the monoazo liquid so that the pH of the monoazo liquid was adjusted to be in the range of 3 to 4. To this monoazo liquid, 1.9 g of m-phenylenediamine-4-sulfonic acid was added with stirring at 5° C. The stirring was continued for 15 hours, so that the coupling reaction was performed, whereby a red bisazo liquid was obtained. 18 g of sodium carbonate was added to which red bisazo liquid to make the bisazo liquid alkaline.

1.4 g of p-aminophenyl ethyl alcohol was dissolved in 50 ml of a 3% aqueous solution of hydrochloric acid. This solution was stirred at temperatures below 5° C. To this solution, an aqueous solution consisting of 20 ml of water and 0.8 g of sodium nitrite was gradually added at temperatures below 5° C., with stirring, so that p-aminopheny ethyl alcohol was diazotized. After the stirring was continued for 30 minutes, the remaining sodium nitrite was decomposed by adding sulfamic acid thereto, whereby a diazo liquid was obtained.

To this diazo liquid, the previously obtained bisazo liquid was gradually added with stirring at temperatures below 5° C., taking 1 hour, so that the diazo coupling reaction was performed. After this diazo coupling reaction, 200 ml of water was added to the reaction mixture. The reaction mixture was then filtered through a filter paper to remove impurities therefrom. The resulting filtrate was made acidic by addition of hydrochloric acid. As a result, Dye No. 1 separated out. It was then filtered off, washed with 250 ml of a 3% aqueous solution of hydrochloric acid two times to remove inorganic salts therefrom, and dried, so that 8.2 g of Dye No. 1 was obtained.

Examples of an aqueous ink composition according to the present invention will now be explained.

EXAMPLE 1

Dye No. 1 obtained by the above synthesis was precipitated using hydrochloric acid, filtered off and washed with water, so that Dye No. 1 was obtained in the form of free acid.

A mixture of the following components was heated to about 50° C. and stirred until completely dissolved. The mixture was then filtered twice through a membrane filter with a 0.22 μm mesh, whereby an aqueous ink composition No. 1 according to the present invention was prepared, in which Dye No. 1 was used in the form of free acid.

| | |
|---|---|
| Dye No. 1 | 4 wt. % |
| Diethylene glycol | 10 wt. % |
| Triethylene glycol | 7 wt. % |
| Glycerin | 8 wt. % |
| Tetramethylammonium hydroxide | 0.6 wt. % |
| 2-pyridinethiol-1-oxide sodium salt | 0.1 wt. % |
| Water | Balance |

In the following examples, all the dyes were used in the form of free acid as in Example 1.

EXAMPLE 2

Aqueous ink composition No. 2 according to the present invention was prepared in accordance with the following formulation by the same procedure as in Example 1.

| | |
|---|---|
| Dye No. 3 | 3 wt. % |
| Dye No. 7 | 1 wt. % |
| Glycerin | 5 wt. % |
| Diethylene glycol | 15 wt. % |
| N—methyl-2-pyrrolidone | 5 wt. % |
| Tetraethylammonium hydroxide | 0.9 wt. % |
| Sodium dehydroacetate | 0.3 wt. % |
| Water | Balance |

EXAMPLE 3

Aqueous ink composition No. 3 according to the present invention was prepared in accordance with the following formulation by the same procedure as in Example 1.

| | |
|---|---|
| Dye No. 2 | 3 wt. % |
| Dye No. 7 | 1 wt. % |
| Glycerin | 5 wt. % |
| Polyethylene glycol 200 | 20 wt. % |
| Diethylene glycol monobutyl ether | 2 wt. % |
| Lithium hydroxide (1 hydrate) | 0.24 wt. % |
| Sodium pentachlorophenolate | 0.2 wt. % |
| Water | Balance |

EXAMPLE 4

Aqueous ink composition No. 4 according to the present invention was prepared in accordance with the following formulation by the same procedure as in Example 1.

| | |
|---|---|
| Dye No. 5 | 3 wt. % |
| Dye No. 2 | 1 wt. % |
| Ethylene glycol | 10 wt. % |
| Diethylene glycol | 10 wt. % |
| 1,3-dimethylimidazolinone | 0.5 wt. % |
| Tetrapropylammonium hydroxide | 0.9 wt. % |
| Lithium hydroxide (1 hydrate) | 0.1 wt. % |
| Preservative agent (Hokucide LX-II made by Hokko chemical Industry, Co., Ltd.) | 0.2 wt. % |
| Water | Balance |

EXAMPLE

Aqueous ink composition No. 5 according to the present invention was prepared in accordance with the following formulation by the same procedure as in Example 1.

| | |
|---|---|
| Dye No. 13 | 4 wt. % |
| Diethylene glycol | 20 wt. % |
| Glycerin | 10 wt. % |
| Methyltriethanolammonium hydroxide | 1.1 wt. % |
| Preservative agent (Hokucide LX-II) | 0.2 wt. % |
| Water | Balance |

EXAMPLE 6

Aqueous ink composition No. 6 according to the present invention was prepared in accordance with the following formulation by the same procedure as in Example 1.

| | |
|---|---|
| Dye No. 4 | 3 wt. % |
| Glycerin | 5 wt. % |
| Polyethylene glycol 200 | 25 wt. % |
| Methyltriethylammonium hydroxide | 0.8 wt. % |
| Preservative agent (Hokucide LX-II) | 0.2 wt. % |
| Water | Balance |

EXAMPLE 7

Aqueous ink composition No. 7 according to the present invention was prepared in accordance with the following formulation by the same procedure as in Example 1.

| | |
|---|---|
| Dye No. 14 | 2 wt. % |
| Dye No. 16 | 2 wt. % |
| Diethylene glycol | 20 wt. % |
| Glycerin | 10 wt. % |
| Tetramethylammonium hydroxide | 0.55 wt. % |
| Preservative agent (Hokucide LX-II) | 0.2 wt. % |
| Water | Balance |

Comparative Example I

Example 1 was repeated except that tetramethylammonium hydroxide employed in Example 1 was replaced by sodium hydroxide in an amount of 0.26 wt.% (equimolar to the tetrmethylammonium hydroxide), whereby a comparative aqueous ink composition No. 1 was prepared.

Comparative Example 2

Example 2 was repeated except that tetraethylammonium hydroxide employed in Example 2 was replaced by potassium hydroxide in an amount of 0.34 wt.% (equimolar to the tetraethylammonium hydroxide), whereby a comparative aqueous ink composition No. 2 was prepared.

Comparative Example 3

Example 3 was repeated except that lithium hydroxide employed in Example 3 was replaced by ammonium hydroxide (10%) ammonia water) in an amount of 0.97 wt.% (equimolar to the lithium hydroxide), whereby a comparative aqueous ink composition No. 3 was prepared.

Comparative Example 4

Example 2 was repeated except that tetraethylammonium hydroxide employed in Example 2 was replaced by triethylamine in an amount of 0.68 wt.% (equimolar to the tetramethylammonium hydroxide), whereby a comparative aqueous ink composition No. 4 was prepared.

Comparative Example 5

Example 2 was repeated except that Dye No. 3 and Dye No. 7 employed in Example 2 were replaced by C.I. Direct Black 32, which was purified by subjecting commercially available C.I. Direct Black 32 to acid precipitation, filtering the precipitated dye, washing with water and drying the same, whereby a comparative aqueous ink composition No. 5 was prepared.

Comparative Example 6

Comparative aqueous ink composition No. 6 was prepared in accordance with the following formulation by the same procedures as in Example 1.

| | |
|---|---|
| C.I. Food Black 2 (tetraethylammonium salt) | 4 wt. % |
| Glycerin | 5 wt. % |
| Diethylene glycol | 15 wt. % |
| N—methyl-2-pyrrolidone | 5 wt. % |
| Triethylene glycol | 7 wt. % |
| Sodium dehydroacetate | 0.3 wt. % |
| Water | Balance |

In the above, C.I. Food Black 2 (tetraethylammonium salt) was prepared by subjecting commercially available C.I. Food Black 2 to acid precipitation using tetraethylammonium acetate, and washing the precipitated C.I. Food Black with ethanol.

This comparative example corresponds to Example 2. As shown above, in this comparative example, Dye No. 3 and Dye No. 7 employed in Example 2 were replaced by the C.I. Food Black 2, and tetraethylammonium hydroxide was not employed.

Comparative Example 7

Example 2 was repeated except that Dye No. 3 and Dye No. 7 employed in Example 2 were replaced by D.I. Direct Black 19, which was purified by subjecting commercially available C.I. Direct Black 19 to acid precipitation, filtering the precipitated C.I. Direct Black 19, washing with water and drying the same, whereby a comparative aqueous ink composition No. 7 was prepared.

Aqueous Ink compositions Nos. 1~7 according to the present invention and comparative aqueous ink compositions Nos. 1~3 were checked on the following points:

(1) Clarity of Images

The clarity of images obtained by each of the above ink compositions was investigated by causing each ink composition to issue from a nozzle of an ink-jet printer of a commercially available word processor (Riport 5600 J made by Ricoh Company, Ltd.) to impinge on a sheet of commercially available high quality paper. The results are show in Table 1. A mark "o" in the image clarity indicates that the obtained images were clear.

(2) Light Resistance of Images

The initial image density $d_0$ of the printed images in each image sample obtained in the above test (1) was measured, and each image sample was then exposed to light of a carbon arc lamp by a fade meter at 63° C. for 3 hours and the density of $d_1$ of the images of the sample was measured by a Macbeth densitometer. From the $d_0$ and $d_1$ the resistance to light of the images obtained by each ink composition was determined by the following formula:

$$\frac{d_0 - d_1}{d_0} \times 100\%$$

(3) Water Resistance of Images

Each image smple obtained in the above test (1) was immersed in water at a temperature of 30° C. for one minute and was then taken out. Immediately after this, the density $d_2$ of the images printed on the immersed image sample was measured by the Macbeth densitometer. From the initial image density $d_0$ measured in the above test (2) and the above obtained $d_2$, the resistance to water of the images printed by each ink composition was determined in accordance with the following formula:

$$\frac{d_0 - d_2}{d_0} \times 100\%$$

(4 Preservability of Aqueous Ink Composition

Each ink composition was tightly sealed in polyethylene containers and allowing them to stand at −20° C., 4° C., 20° C., 50° C. and 70° C. for 3 months. At the end of this test (i.e., after 3 months) the changes in the viscosity, surface tension, and electric conductivity of each ink composition before and after the test, and separation of precipitates from the ink compositions were checked. The results are shown in Table 1. In the table, a mark "o" in the preservability indicates that there were no changes in the viscosity, surface tension and electric conductivity of the ink composition, and no separation of precipitates from the ink composition after 3 months.

(5) Clogging of Nozzle

The clogging of the nozzle was checked for each ink composition by using three printers of the same type as that employed in the above-mentioned image clarity test (1), with the three printers stopped at 20° C. 65%RH for 3-months after the above-mentioned image clarity test, followed by starting the printers to see whether or not the normal operation of the printers is possible. A mark "o" in the nozzle clogging in Table 1 indicates that normal operation was possible with all the three printers, and a mark "x" indicates that normal operation was possible with one or two of the three printers. In the printer for Riport 5600 J employed in this test, there is provided a device for automatically stopping the printer upon detecting the clogging of the nozzle with the ink composition by which the ejection of ink droplets becomes impossible or the ejecting direction is significantly deviated from the initially set ejecting direction.

(6) Content of Lithium Ion or Quaternary Ammonium Ion in Each Aqueous Ink Composition The content of lithium ion and/or a quaternary ammonium ion relative to the entire cations in each aqueous ink composition was determined from the amount of lithium ion or a quaternary ammonium ion in the formulation of each example.

TABLE 1

|  | Image Clarity | Light Resistance (Fading Ratio %) | Water Resistance (Fading Ratio %) | Preservability | Clogging of Nozzole | Ion Content (%) |
|---|---|---|---|---|---|---|
| Example 1 | o | 3.2 | 5.4 | o | o | 82 |
| Example 2 | o | 4.5 | 3.8 | o | o | 52 |
| Example 3 | o | 3.0 | 4.5 | o | o | 55 |
| Example 4 | o | 4.3 | 2.6 | o | o | 78 |
| Example 5 | o | 5.2 | 3.7 | o | o | 67 |
| Example 6 | o | 3.8 | 5.6 | o | o | 72 |
| Example 7 | o | 4.3 | 3.4 | o | o | 78 |
| Comparative Example 1 | o | 3.0 | 7.8 | o | x | 0 |
| Comparative Example 2 | o | 4.6 | 7.5 | o | — | 0 |
| Comparative Example 3 | o | 3.2 | 4.3 | o | — | 0 |
| Comparative Example 4 | o | 7.5 | 2.2 | o | — | 0 |
| Comparative Example 5 | o | 3.5 | 2.9 | *Precipitation at low temperatures | — | 75 |
| Comparative Example 6 | o | 4.0 | 30.8 | o | o | 82 |
| Comparative Example 7 | o | 3.3 | 2.9 | o | x | 72 |

The above results indicate that the aqueous ink compositions according to the present invention are better at least in water resistance, light resistance, or preservability, and particularly improved on the clogging problem, as compred with Comparative Examples.

What is claimed is:

1. An aqueous ink composition comprising:
   (a) a dye having formula (I) in an amount of 0.5 to 6.0 wt.%, in which 20% or more of the total of the cations of —SO₃X and —OX groups directly connected to the aromatic rings thereof is replaced by Li⁺ ion or a quaternary ammonium ion,

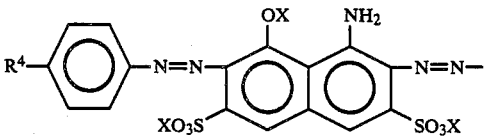

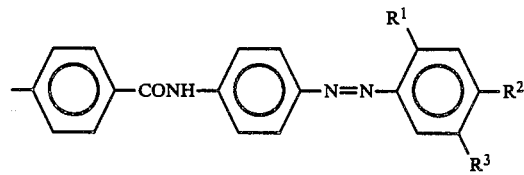

wherein X represents a cation; R¹ represents hydrogen, a hyroxyl group, an alkyl group having 1 to 4 carbon atoms, or an amino group; R² represents

(in which R⁵ and R⁶ each represent hydrogen, an alkyl group having 1 to 4 carbon atoms, a hydroxyethyl group, or a cyanoethyl group); R³ represents hydrogen, —SO₃X; and R⁴ represents —C₂H₄OX, (b) a polyhydric alcohol in an amount of at least 10 wt.%; and
(c) water.

2. The aqueous ink composition as claimed in claim 1, wherein said quaternary ammonium ion has the formula of

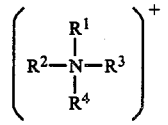

wherein R¹, R², R³ and R⁴ each represent an alkyl group having 1 to 4 carbon atoms which may have a substituent selected from the group consisting of halogen, a hydroxyl group, and —OCH₂CH₂OH.

3. The aqueous ink composition as claimed in claim 1, wherein said polyhydric alcohol is selected from the group consisting of ethylene glycol, diethylene glycol, triethylene glycol, tetraethylene grlycol, polyethylene glycol (M.W. 200~800), glycerine, diethanolamine, triethanolamine, and propylene glycol.

4. The aqueous ink composition as claimed in claim 1, further comprising a water-soluble organic solvent selected from the group consisting of ethylene glycol monoethyl ether, diethylene glycol monomethyl ether, diethylene glycol monoethyl ether, diethylene glycol monobutyl ether, diethylene glycol monophenyl ether, triethylene glycol monomethyl ether, triethylene glycol monoethyl ether, N-methyl-2-pyrrolidone, 2-pyrrolidone, and 1,3-dimethyl imidazolidinone.

5. The ink composition of claim 1 wherein said dye of formula (I), in the form of the free acid, is selected from the group consisting of

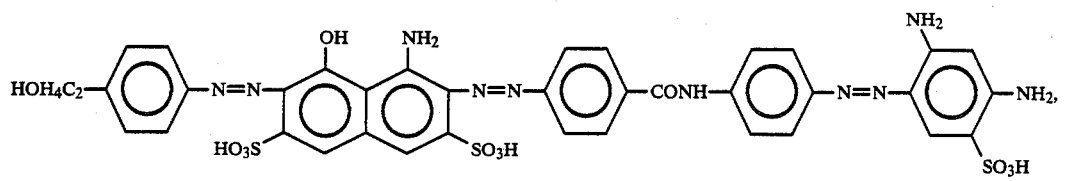
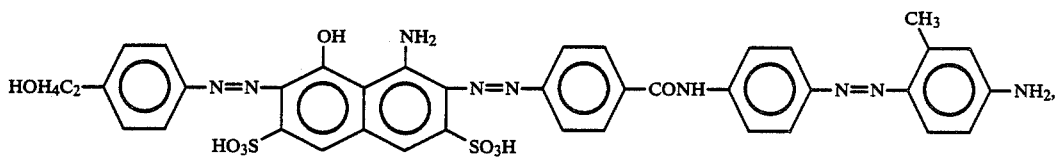
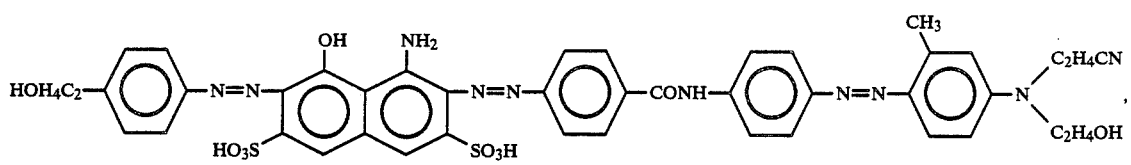
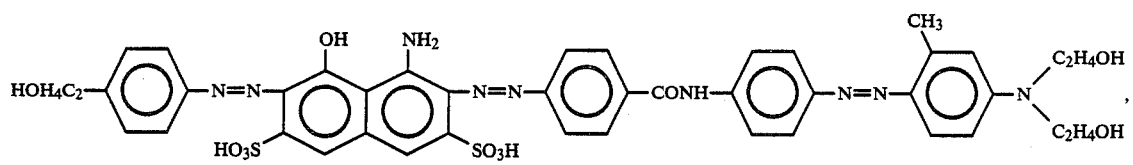
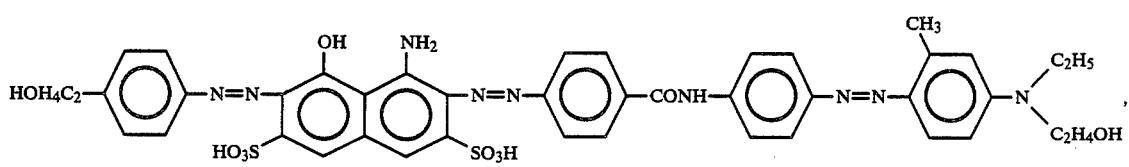
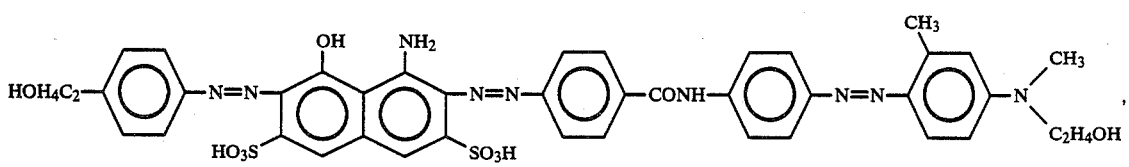
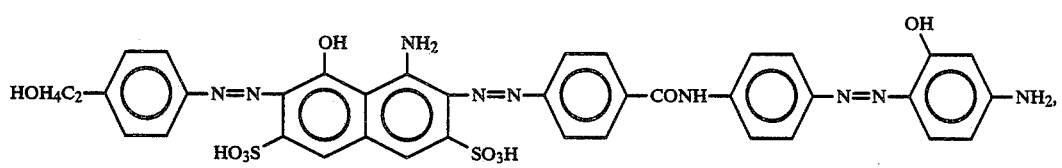
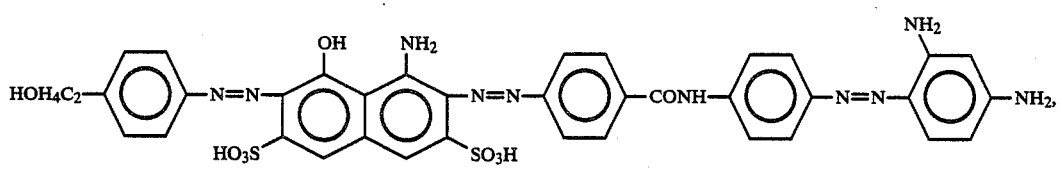
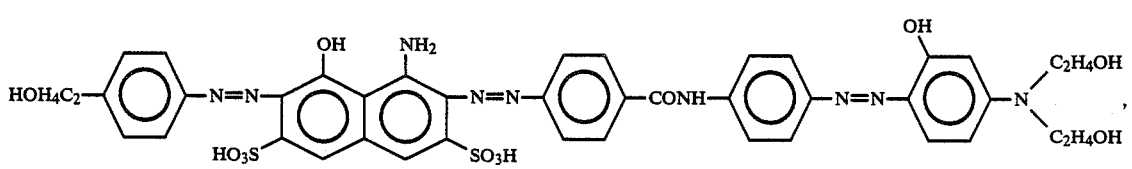

-continued
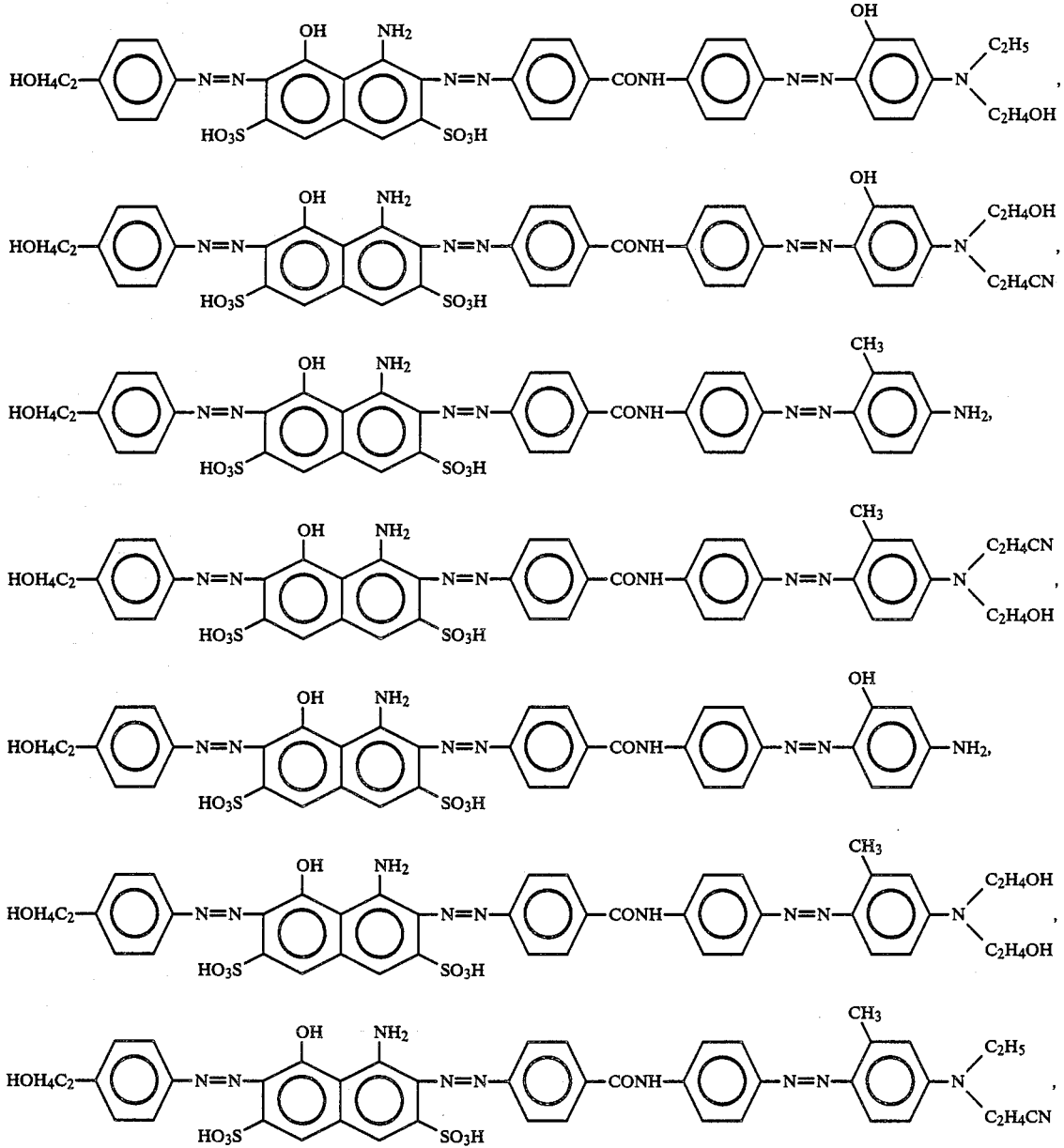
and
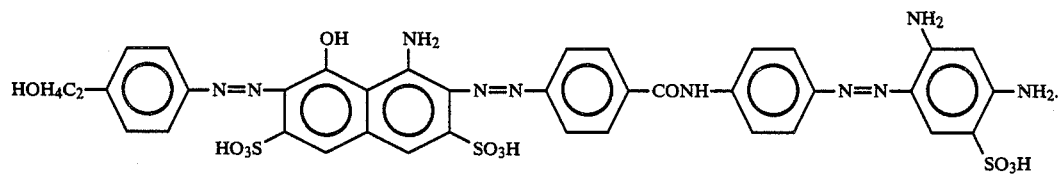
* * * * *